United States Patent
Lyons (10) Patent No.: US 10,991,225 B1
(45) Date of Patent: Apr. 27, 2021

(54) METHOD AND SYSTEM FOR CHILD SAFETY

(71) Applicant: Robert Lyons, Ottawa (CA)

(72) Inventor: Robert Lyons, Ottawa (CA)

( * ) Notice: Subject to any disclaimer, the term of this patent is extended or adjusted under 35 U.S.C. 154(b) by 0 days.

(21) Appl. No.: 16/178,863

(22) Filed: Nov. 2, 2018

Related U.S. Application Data (60) Provisional application No. 62/581,316, filed on Nov. 3, 2017.

(51) Int. Cl.
| | |
|---|---|
| G08B 21/02 | (2006.01) |
| B60N 2/00 | (2006.01) |
| B60R 21/015 | (2006.01) |
| G08B 21/18 | (2006.01) |
| B60N 2/26 | (2006.01) |
| B60R 21/01 | (2006.01) |

(52) U.S. Cl.
CPC ............ *G08B 21/02* (2013.01); *B60N 2/002* (2013.01); *B60N 2/26* (2013.01); *B60R 21/01512* (2014.10); *G08B 21/182* (2013.01); *B60R 2021/01252* (2013.01)

(58) Field of Classification Search
CPC .. B60N 2/002; B60R 21/01512; G08B 21/02; G08B 21/182
See application file for complete search history.

(56) References Cited

U.S. PATENT DOCUMENTS

| | | | | |
|---|---|---|---|---|
| 6,688,185 B2* | 2/2004 | Knox | ..................... | B60N 2/002 73/768 |
| 7,265,671 B1* | 9/2007 | Valles | ..................... | B60N 2/002 340/309.16 |
| 7,439,866 B2* | 10/2008 | Wallner | ............... | B60N 2/2806 180/271 |
| 7,463,161 B2* | 12/2008 | Griffin | .................... | B60N 2/002 180/271 |
| 2012/0104826 A1* | 5/2012 | Miller | ................ | A44B 11/2546 297/464 |
| 2014/0015664 A1* | 1/2014 | Watson | .................. | G08B 21/24 340/457.1 |
| 2016/0200250 A1* | 7/2016 | Westmoreland | ........... | B60J 1/17 340/457.1 |
| 2018/0130327 A1* | 5/2018 | Rogers | ................. | G08B 21/028 |

\* cited by examiner

*Primary Examiner* — Syed A Islam
(74) *Attorney, Agent, or Firm* — Aventum IP Law LLP (57) ABSTRACT

A child car seat is disclosed. The car seat has a seat form for accommodating a child. A belt for retaining a child is disposed within the child car seat. A first buckle is operable between a first open position and a second other fastened position, for when fastened fastening the belt to retain a child and for when open facilitating installation and removal of a child from the child car seat. The child car seat also has an integrated interface port for removably retaining a first electronic circuit having communication circuitry for communicating with an automobile. The interface port has electrical conductors for electrically coupling with the electrical circuitry within the first electronic circuit.

22 Claims, 9 Drawing Sheets

Fig. 1

(Prior Art)

METHOD AND SYSTEM FOR CHILD SAFETY

FIELD OF THE INVENTION

The present invention relates generally to child safety systems and, more particularly, to a system and method for responding to problems with a child in a child restraint within an automobile.

BACKGROUND

Infant or child car seats are legally required in some form in every state in the United States and many other countries. Since 1998, it has been estimated that more than five hundred child deaths are attributed to heat exposure or hyperthermia because of a child being left unattended in a vehicle. Over half of these deaths have been estimated to have occurred because the caregiver forgot the child was in the vehicle. See, Catherine McLaren, Jan Null and James Quinn, Heat Stress from Enclosed Vehicles: Moderate Ambient Temperatures Cause Significant Temperature Rise in Enclosed Vehicles, Pediatrics (Official Journal of American Academy of Pediatrics; Vol. 116, No. 1 Jul. 2005 at pp.e109; see also Jan Null, Hypothermia Deaths of Children in Vehicles, http://ggweather.com/heat, Department of Geosciences at San Francisco State University. Studies show that within an averaged elapse lapsed time of 10 minutes, the temperature rise is an average of 19 degrees Fahrenheit.

For example, with an outside temperature of 80 degrees F., within ten minutes the average inside car temperature is 99 degrees F. Within twenty minutes, the average interior car temperature is 109 degrees F. "Heatstroke occurs when a person's temperature exceeds 104 degrees F. and their thermoregulatory mechanism is overwhelmed." Id. "A core body temperature of 107 degrees F. is considered lethal as cells are damaged and internal organs shut down. Children's thermoregulatory systems are not as efficient as an adult's and their body temperatures warm at a rate 3 to 5 times faster than an adult's." Id., See also, National Highway Traffic Safety Administration at www.nhtsa.gov. As a result, limiting the amount of time a child is exposed to high or extreme temperatures is critical.

Many critical rescues of endangered children left in vehicles have been performed by accidental bystanders who break into the vehicle to perform the rescue. In recent years states have passed legislation limiting criminal prosecution or civil damages resulting from well-intentioned break-ins to rescue children. Another significant issue is improper use of car seats. For example, a car seat may be installed incorrectly with its tether strap unconnected or a child may be incorrectly fastened or remain unfastened during use. These situations can result in harm to the child or even death.

Accordingly, what is needed is a system and method for responding to at least some forms of incorrect use of a child car seat including those caused by inadvertence or error.

SUMMARY OF EMBODIMENTS OF THE INVENTION

In accordance with an embodiment of the invention there is provided a child car seat comprising: a seat form for accommodating a child; a detachable anchoring; a first belt for retaining a child within the child car seat; a first buckle operable between a first open position and a second other fastened position, for when fastened fastening the belt to retain a child and for when open facilitating installation and removal of a child from the child car seat; and an interface port for removably retaining a first electronic circuit comprising electrical circuitry comprising communication circuitry for communicating with an automobile, the interface port comprising a plurality of electrical conductors for electrically coupling with first circuitry the first electronic circuit.

In accordance with another embodiment, there is provided a child car seat comprising: an interface for interfacing with a communication circuit for communicating with an automobile, the communication circuit removable and portable relative to the child car seat, the interface for electrically coupling with the communication circuit and for maintaining the communication circuit in a first physical relation to the interface.

In accordance with another embodiment, there is provided a Key fob comprising: a communication circuit for communicating with an automobile; a battery for powering the communication circuit; a temperature sensing circuit; and a first circuit portion forming an incomplete circuit for coupling with a second circuit portion forming part of a removable car safety restraint.

In some embodiments, the first circuit portion is for providing power from the battery to the communication circuit and to the temperature sensing circuit when closed by the second portion of the circuit.

In some embodiments the key FOB is absent any transducers for being actuated by a user of the Key Fob for actuation thereof or for actuation of features of a remote system.

In accordance with another embodiment, there is provided a Key fob comprising: a communication circuit for communicating with an automobile and for controlling the automobile; and absent any transducers for being actuated by a user of the Key Fob for actuation thereof or for actuation of features of the automobile.

In some embodiments the key FOB comprises a temperature sensing circuit.

In some embodiments the key FOB comprises a battery for powering of the key FOB circuitry.

In accordance with another embodiment, there is provided a child car seat system comprising: an interface for interfacing with a communication circuit for communicating with an automobile, the communication circuit portable relative to the child car seat, the interface for electrically coupling with the communication circuit and for maintaining the communication circuit in a first physical relation to the interface; and a Key Fob comprising a communication circuit for communicating with an automobile and at least a circuit for electrically coupling with the interface.

In accordance with another embodiment, there is provided a sensor apparatus comprising: a first electronic circuit comprising electrical circuitry comprising communication circuitry for communicating with an automobile, and a sensor for sensing a buckle to determine fastening thereof, the sensor sensing an orientation of at least one of the buckle and of a strap retaining a portion of the buckle.

In accordance with another embodiment, there is provided a child car seat with sensors integrated therein to sense installation of the child car seat. In some embodiments, a tether strap of the child car seat comprises a tension sensor to sense that the tether strap is tightly fastened. In another embodiment the child car seat comprises pressure sensors to ensure that the child car seat is fastened tightly against an interior of a vehicle.

BRIEF DESCRIPTION OF THE DRAWINGS

Exemplary embodiments of the invention will now be described in conjunction with the following drawings, wherein similar reference numerals denote similar elements throughout the several views, in which.

DETAILED DESCRIPTION OF EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Definitions

Child Car Seat is a removable safety device for restraining children within a vehicle and includes rear facing car seats, forward facing car seats, multi part car seats, booster seats with restraints, etc. It is recognized that some multi part car seats have one portion installed permanently in a vehicle and another that is removable; these are also considered to be car seats when taken one in conjunction with the other. Some multi part car seats are usable as a single part or with an installed base. The single part is considered a car seat in isolation or when taken in conjunction with the base.

Key Fob is a wireless communication device including security circuitry for communicating with communication circuitry within a vehicle for controlling at least some portion of the vehicle. Examples of Key Fobs include keyless entry devices for automobiles and wireless "keys" for use in starting automobiles.

Figure 1:
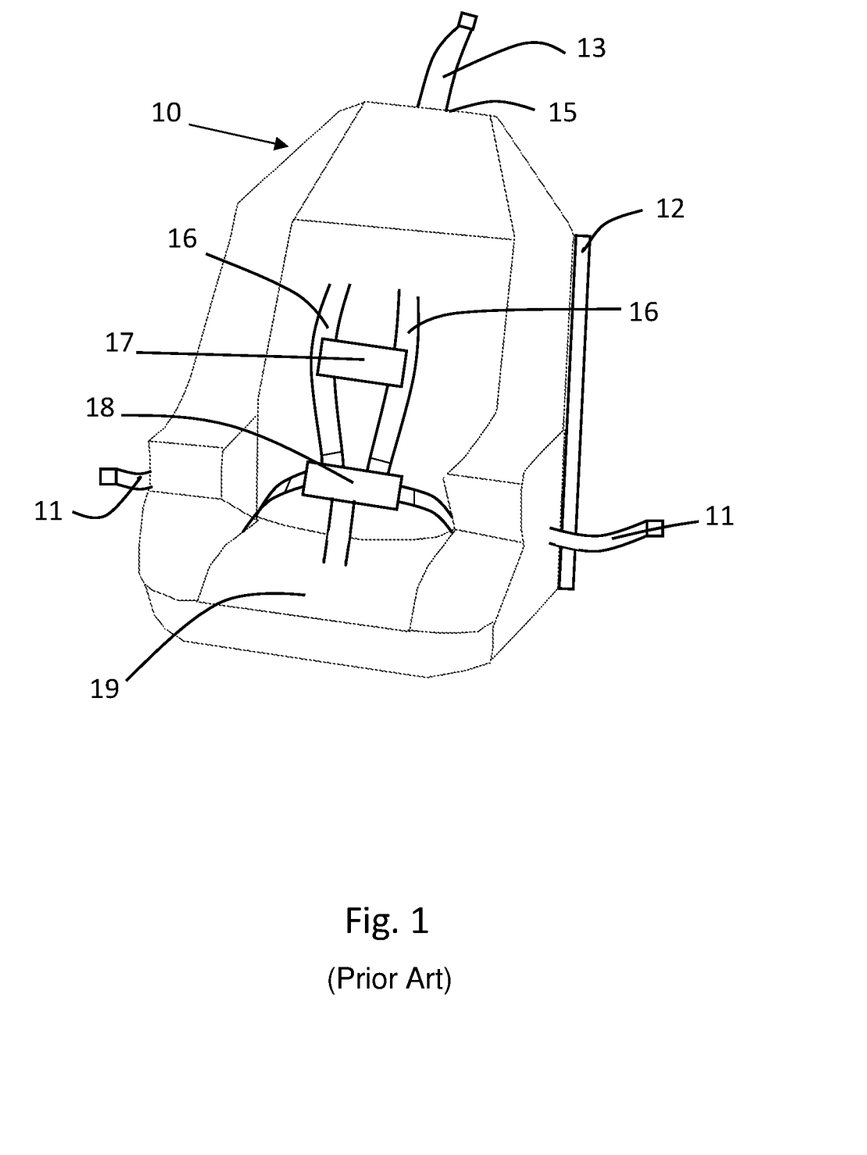
FIG. 1 is a prior art car seat.

Referring to FIG. 1, shown is a typical prior art child car seat 10 comprising a support mechanism 11 in the form of tethers for being attached to anchors within the car. Alternatively, the support mechanism is fastened within a car by an existing seat belt. A tether 13 in the form of a strap is for being fastened behind the car's seat to secure in place a top portion 15 of the car seat. Within the car seat 10 are shoulder straps 16, a chest buckle 17 and a lap buckle 18. The car seat 10 also comprises a frame 12 for stability and a foam pad 19 for comfort.

Car seats of this construction are well known and are commonplace in North America and worldwide.

Many prior art devices seek to solve safety issues with child car seats by building specialty features into the car seats such as sensors, special adapters, and so forth intended to remind or alert the driver or caregiver, but there is significant resistance to implementing standardized solutions to safety, both from the car seat manufacturers and from others who would need to be involved in the process. Thus, many solutions are impracticable or unimplemented due to cost, complexity and lack of industry wide agreement.

Figure 2:
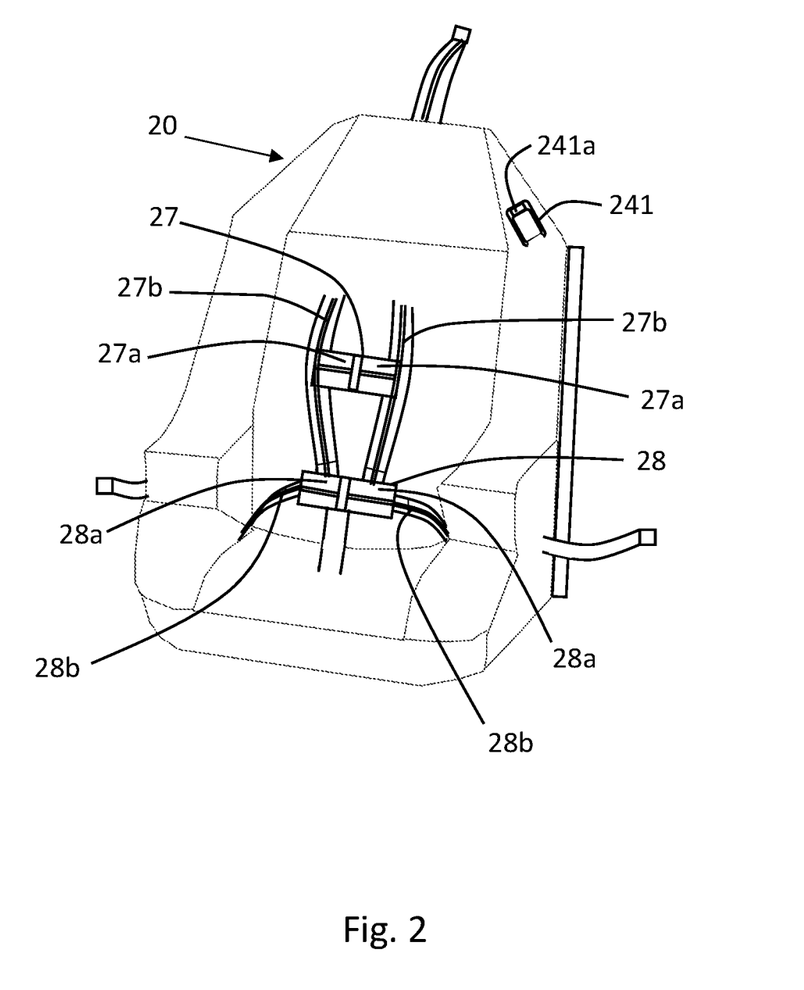
FIG. 2 is a car seat according to an embodiment.

Referring to FIG. 2, shown is a child car seat 20 according to an embodiment. Here, the child car seat 20 is equipped with electrical connections and conductors to allow for electronics to sense predetermined configurations. For example, as shown, the lap buckle 28 and the chest buckle 27 are each provided with contacts 28a and 27a, respectively, for being engaged one with another, when each buckle is in a secured position. Each of the buckles includes a pair of conductors 28 b and 27b, respectively, electrically coupled to the contacts 28a and 27a, respectively, and extending to a common interconnect to allow connection to a sensor circuit 24 (shown in FIG. 4).

Thus, a simple circuit within circuit 24 (shown in FIG. 4) verifies that a buckle is connected by verifying continuity of a circuit to that buckle. As shown, the circuit 24 (shown in FIG. 4) is not part of the child car seat 20; instead, the child car seat 20 supports a circuit 24 being coupled therewith. The circuit 24 (shown in FIG. 4) and some advantages to a separate circuit are described hereinbelow.

When buckle 27 is fastened, a signal can traverse the conductors 27b to that buckle uninterrupted. When buckle 27 is open, in an unfastened position, the signal is unable to traverse the conductors 27b—the circuit appears open. Thus, if the closure of that circuit is required to "turn on" the overall circuit, then little to no battery power is consumed in the circuit 24 (shown in FIG. 4) until buckle 27 is fastened.

When buckle 28 is fastened, a signal can traverse the conductors 28b to that buckle uninterrupted. When buckle 28 is open, in an unfastened position, the signal is unable to traverse the conductors 28b—the circuit appears open. Thus, if the closure of that circuit is required to "turn on" the overall circuit, then little to no battery power is consumed in the circuit 24 (shown in FIG. 4) until buckle 28 is fastened.

Placing the conductors 27b and 28b in parallel is a straightforward circuit design for "turning on" the circuit 24 upon fastening of either buckle 27 or buckle 28 or both.

As shown in the car seat 20 of FIG. 2, the car seat 20 is relatively unmodified with simple contacts and conductors—wires—added to the design but without any complex electronics or electronic features. Thus, the child car seat itself is not a greatly different product from prior child car seats in design or manufacture.

Also shown in FIG. 2 is adapter indent 241 for supporting an electronic FOB 400 (shown in FIG. 4)—a device comprising circuit 24 for sensing a state of the buckles 27 and 28 and for responding thereto. The adapter indent 241 includes contacts 241a forming a termination of the conductors 27b and 28b to the buckles 27 and 28, respectively, and is shaped and sized for accepting and retaining the FOB with contacts of the FOB and the contacts of the adapter indent 241 in electrical communication one with another. Electrical communication is typically achieved through direct contact, but optionally capacitive coupling or inductive coupling is relied upon.

Figure 3A:
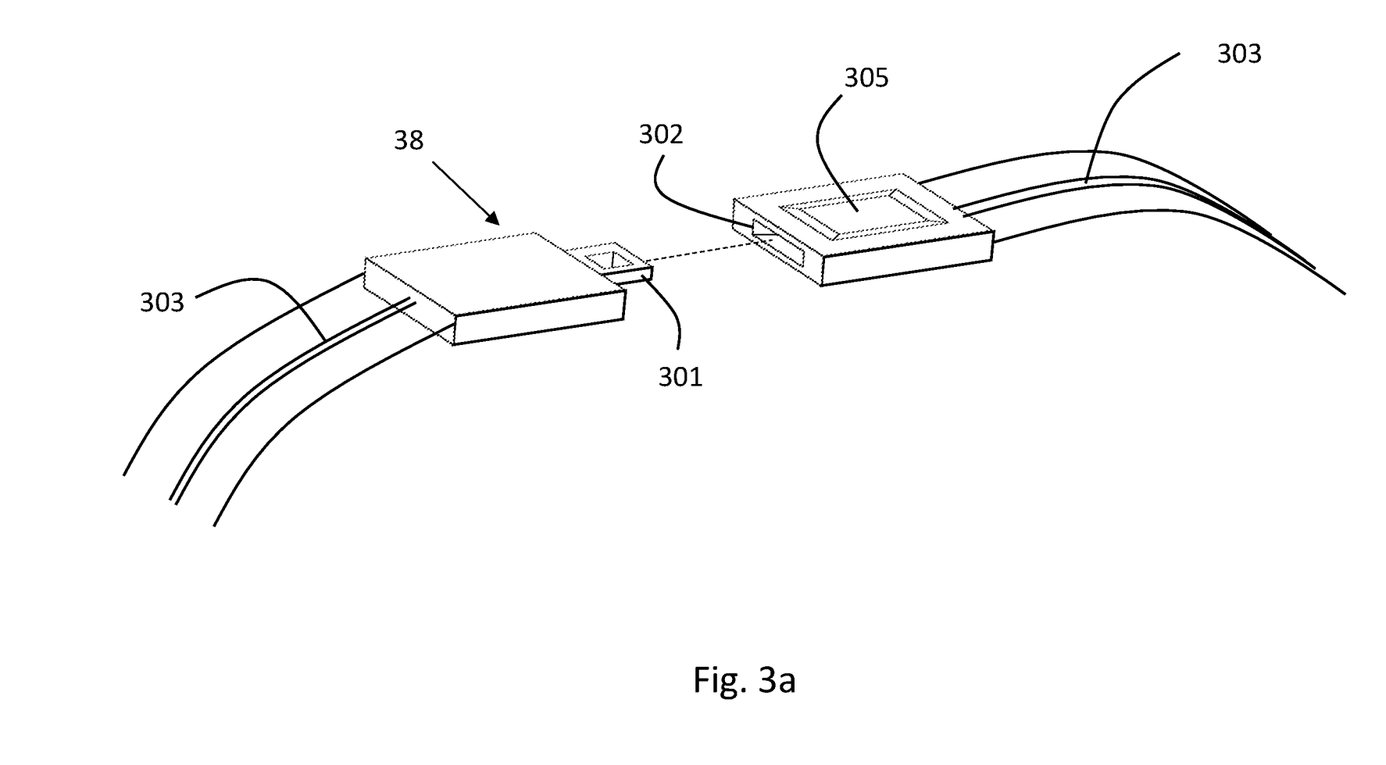
FIGS. 3a-3d are exemplary sensors according to an embodiment.
Figure 3B:
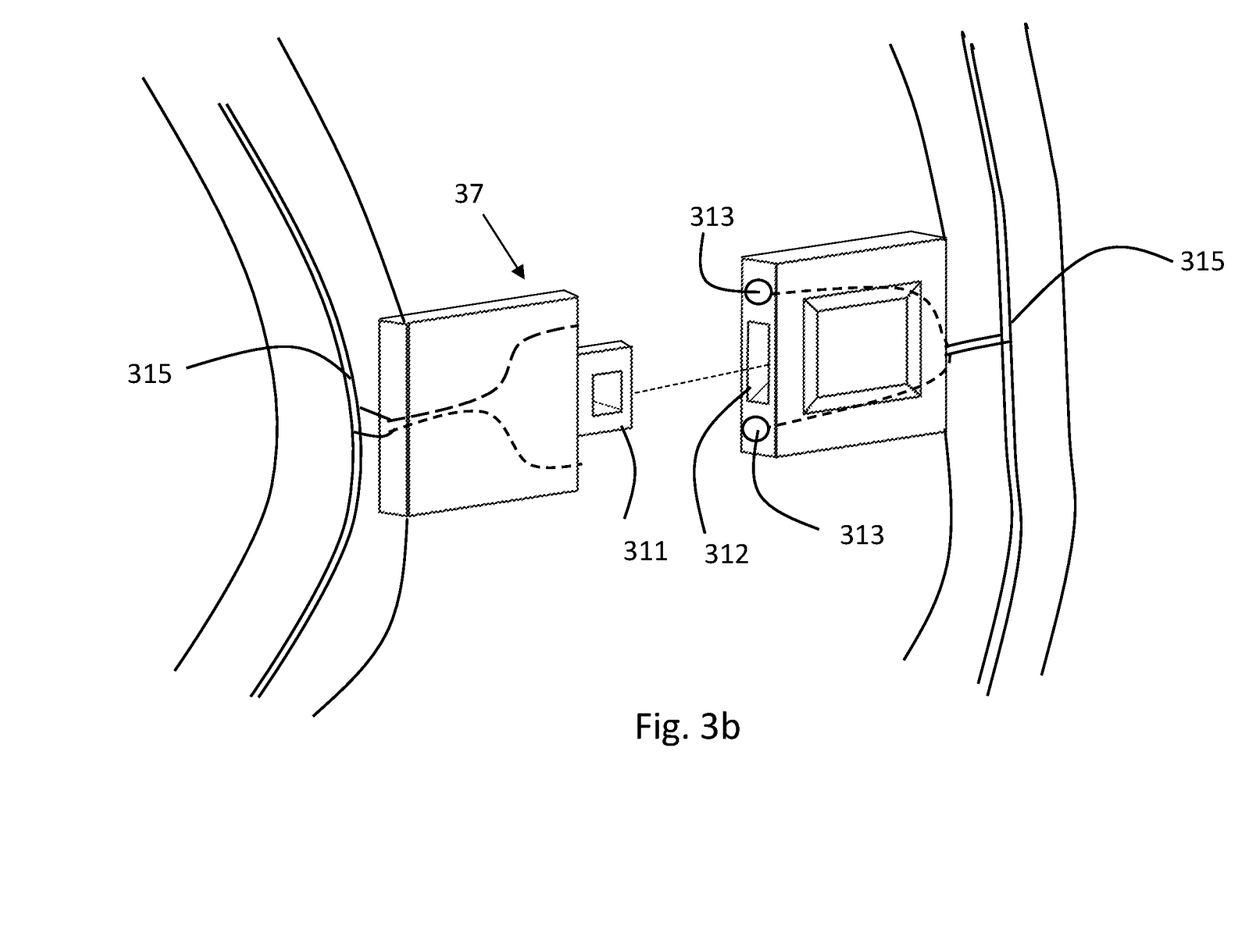
Figure 3C:
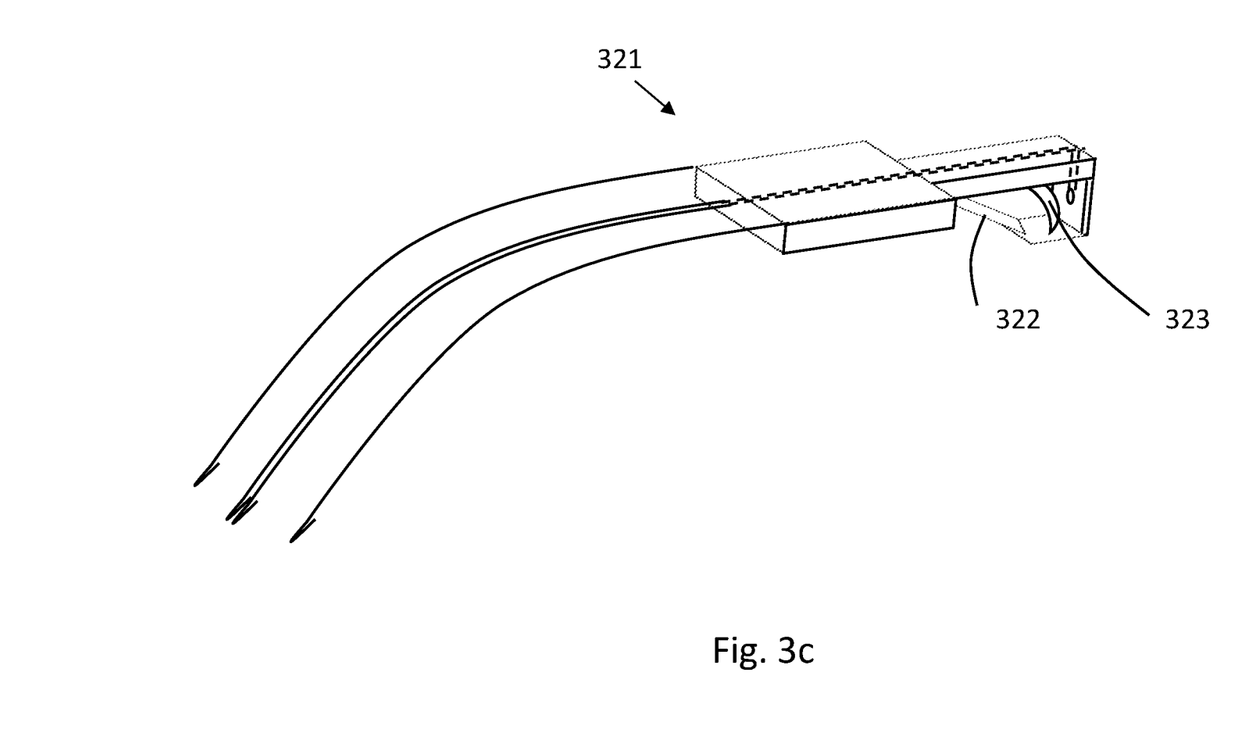
Figure 3D:
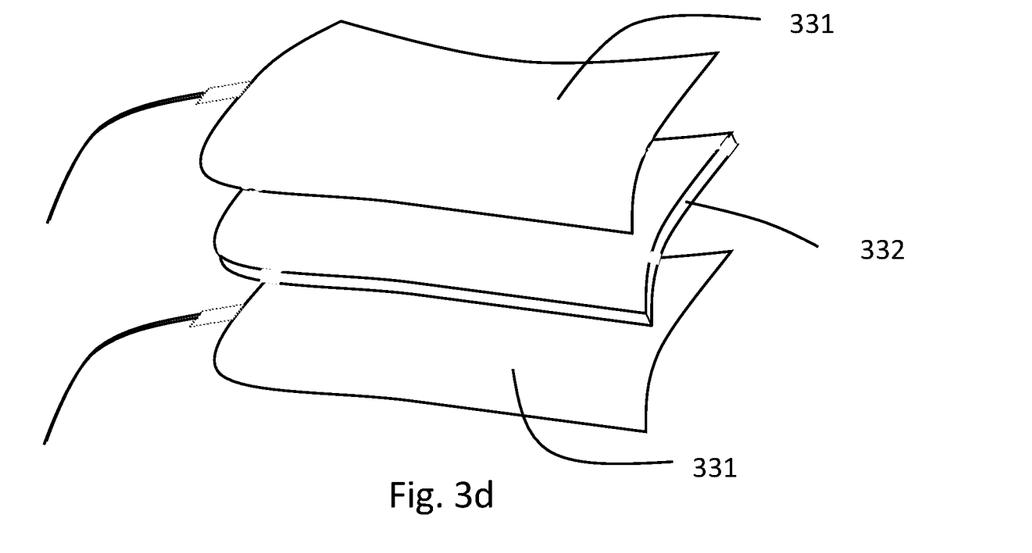

Referring to FIGS. 3a-3d, shown are a number of "sensors" implementable within child car seat 20 and for use with embodiments of the invention. In FIG. 3a is shown a lap buckle 38. The lap buckle includes a metal insert tab 301 and a metal locking tab 302. To each of these is connected conductors 303 for electrical communication with an external circuit (not shown). Release button 305 is shown as most lap buckles include a release button such as this. In FIG. 3b is shown a chest buckle 37. Here, the chest buckle 37 is made of a first plastic tab 311 and a second other plastic receiving portion 312. When fastened completely, the plastic portions 311 and 312 engage in a predetermined alignment. Thus, contacts 313 are placed on the plastic to ensure that they are connected one to another when and only when the buckle is completely fastened. Conductors 315 are attached to the contacts and extend therefrom. Referring to FIG. 3c, shown is a tethering clip 321. The tethering clip 321 is modified to sense that the clip is both tethered to an anchor and fully on the anchor. A closure 322 on the tethering clip 321 in the form of a metal spring leaf has a contact thereon for verifying that it is pressing against the frame 322 of the tether clip 321. The tether clip 321 further includes a central fill 323 for causing conducting of current when something is therewithin and for other than supporting current flow when the tether clip 321 is empty. Thus, the tether clip 321 must be about an anchor and closed in order to conduct current. Referring to FIG. 3d, shown is a weight sensor in the form of two contacts 331 separated by a compressible and resilient member 332 for returning the contacts 331 to a spaced apart configuration when no pressure is exerted on the contacts 331. Thus, when placed under or behind a child, the weight compresses the resilient member 332 to cause the contacts 331 to make contact one with another allowing current to flow—the sensor conducts current, but when no child is present, the resilient member 332 spaces the conductors such that the sensor—switch—is open and current does not flow.

Alternatively, the tether comprises a sensor for sensing tension within the tether. When sufficient tension is sensed, it is assumed that the tether is tightly coupled to an automobile.

One of skill in the art can configure, design and implement any number of passive sensors of this type for inclusion into a child car seat.

As is evident from the sensors described, signals from any number of these sensors can be placed in parallel to switch the circuit 24 between inactive "turned off" and active "turned on" modes of operation.

Figure 4:
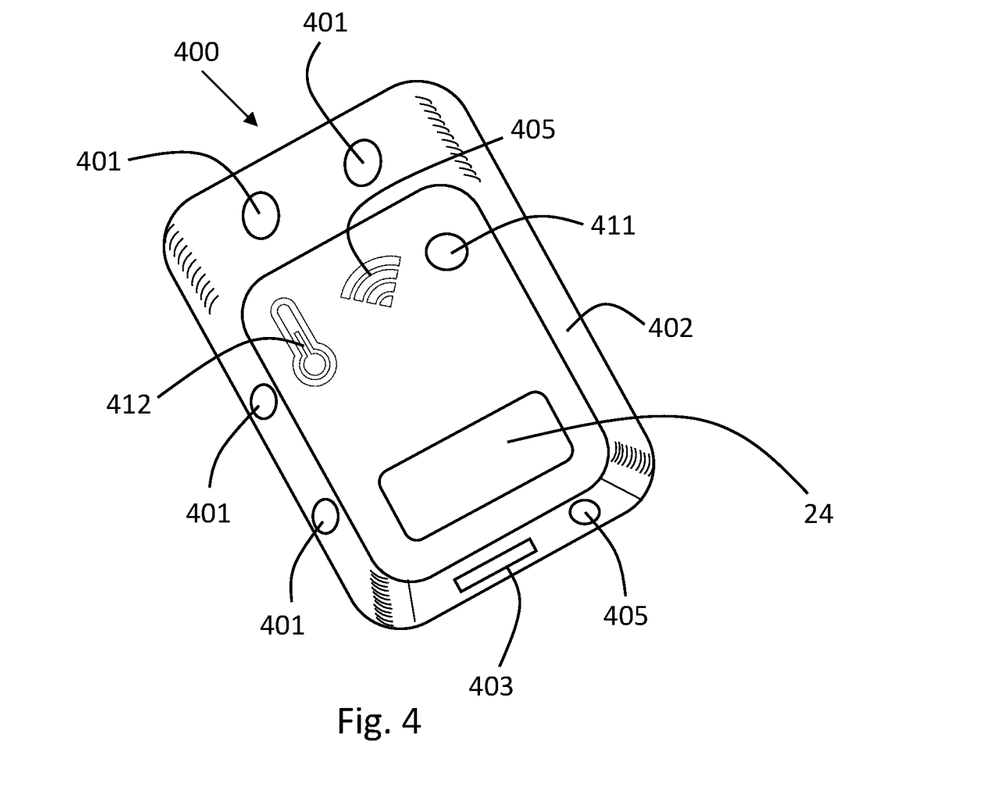
FIG. 4 is a Key Fob according to an embodiment

Referring to FIG. 4, shown is an FOB 400 according to an embodiment. The FOB comprises a number of contacts 401 for coupling with contacts on the child car seat 20. The FOB 400, like a remote car entry FOB includes hardware 402, software (not shown), battery circuitry 403, and communication circuitry 405 for communicating with and controlling a motor vehicle. The features of the FOB 400 and of the vehicle are a matter of design choice by a car manufacturer and, as such, are not within the control or design of a car seat manufacturer.

The FOB 400 includes a switching circuit 411 for activating the FOB 400 only when at least one of the sensor conductors conducts current and, thereby shows that a sensor is actively engaged—for example, a buckle is done up or a child is in the seat. Alternatively, the FOB is activated only when all sensors are actively engaged, for example open sensors are arranged in series. In some embodiments, the FOB 400 comprises a temperature sensor 412 for sensing a temperature at the car seat. In some embodiments, the FOB 400 comprises a sound sensor for sensing crying, barking and other sounds. In some embodiments, the FOB 400 includes a speaker for transmitting sound.

The communication circuitry 405 is active when a circuit within the child car seat 20 is closed indicating a presence of a child in the child car seat 20. If the buckle is used as an indicator, when closed, a child is believed to be present and when open the child is believed to other than present. By using multiple sensors, it is possible better to determine a presence of a child.

In the embodiment of FIG. 4, the circuitry within the FOB 400 is turned off and on by the closing of one, several, or N of M circuits. For example, closing the chest buckle 27 results in activation of the FOB 400. Alternatively, closing the chest buckle 27 and feeling pressure on a pressure sensor results in activation of the FOB 400. Further alternatively, any of the chest buckle 27, the belt buckle 28 or the weight sensor being a closed circuit results in activation of the FOB 400. In this fashion, the battery 403 lasts longer as it is only drained when the FOB 400 is activated.

In the embodiment of FIG. 4, the FOB 400 is provided by a car manufacture of a car in which the child car seat 20 is installed. Thus, the FOB 400 and the car communicate in accordance with a security protocol and feature set determined by the automobile manufacturer. Examples of supportable features are set out below, but a car manufacturer could integrate their automobile electronic system with any of a number of features or third parties to result in a more feature full system.

Figure 5:
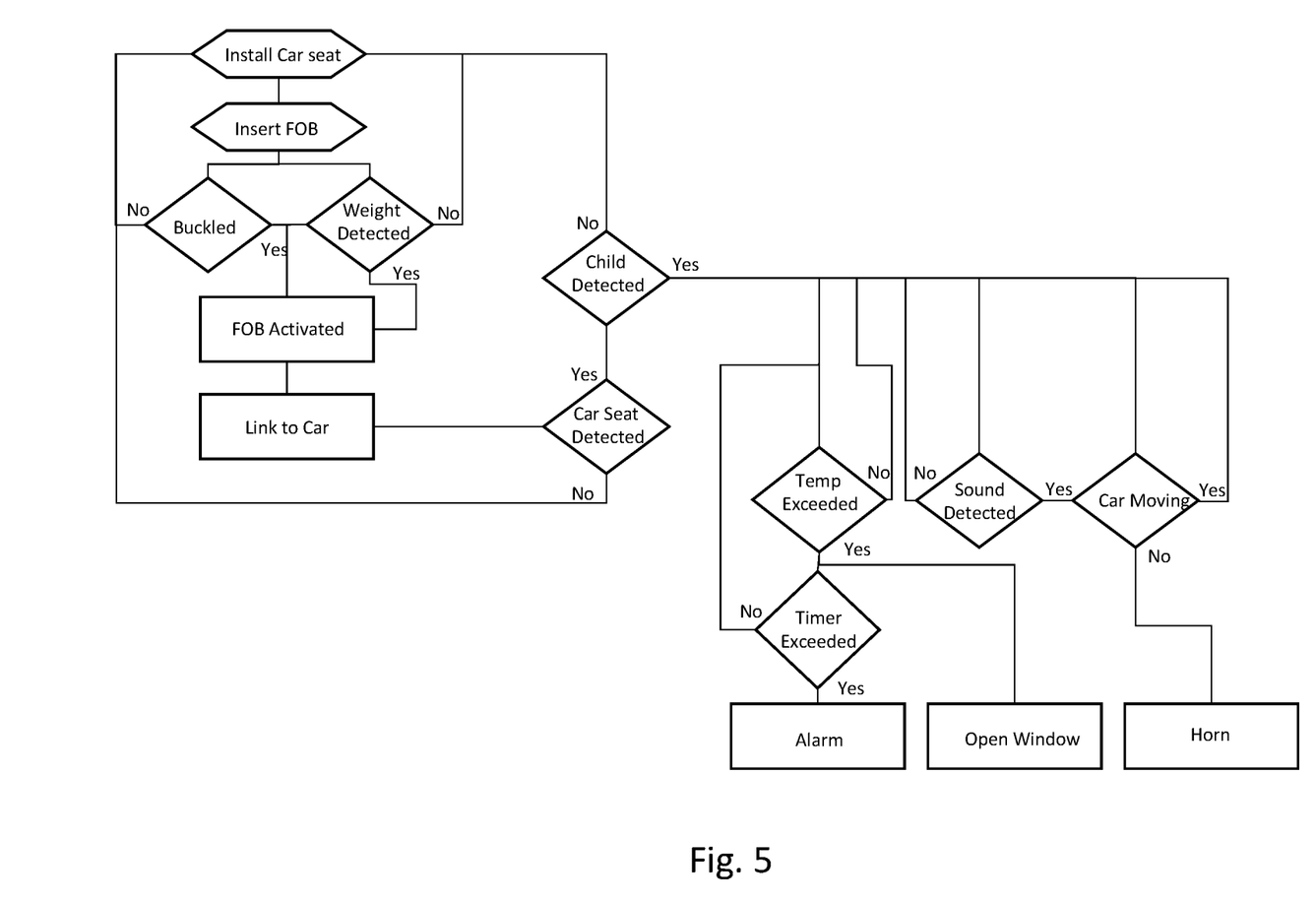
FIG. 5 is a simplified flow diagram of a method of programming a system according to an embodiment.

Referring to FIG. 5, shown is a simplified flow diagram of a method of using a car seat 20 with a FOB 400. The car seat 20 is installed within an automobile. A FOB 400 is inserted into the adapter indent 241 of car seat 20. When a buckle is fastened, the FOB 400 is activated and begins communicating with the automobile. The FOB 400 senses the temperature and each of the sensors within the car seat. It provides the information to the automobile for processing thereby. Further, it verifies the temperature to ensure safety of a child should one be within the car seat 20. When an alarm condition occurs, for example the car is moving without a properly fastened car seat 20, the car is moving without a properly fastened child, the temperature has exceeded a predetermined threshold, the temperature-time is above a certain predetermined threshold, the child is screaming in the car while it is not running, etc., the FOB communicates to the car to initiate a response. A first response may be opening the car windows or sounding an alarm internal to the automobile. When the alarm has little overall effect on safety, opening the windows is used to mitigate overheating. If the vehicle is stationary, the car horns or another sounding device is used to get the attention of bystanders to affect quick and meaningful intervention.

Figure 6:
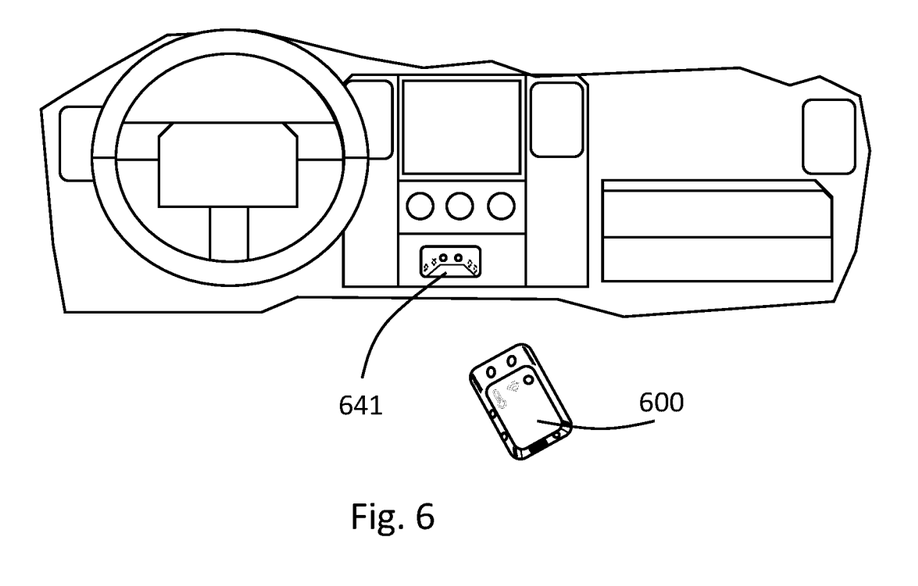
FIG. 6 is a car dashboard according to an embodiment.

Referring to FIG. 6, shown is a dashboard of a car having a mating insert 641 for programming a FOB 600. The mating insert 641 is for accepting FOB 600 and includes contacts for use in programming of FOB 600 to operate with the vehicle. Since the programming is done by the vehicle, the FOB can be uniquely set up to operate with the vehicle and to support all of the features of the vehicle. Further, by updating the vehicle's programming during routine maintenance, the FOB features are optionally modified, improved or updated regularly, once the FOB 600 is reprogrammed. Commonly in most cars there is an On-Board Diagnostic (OBD) port for diagnosing and controlling different car functions. The current standard for the OBD port is capable of providing power to a device connected thereto.

Figure 7:
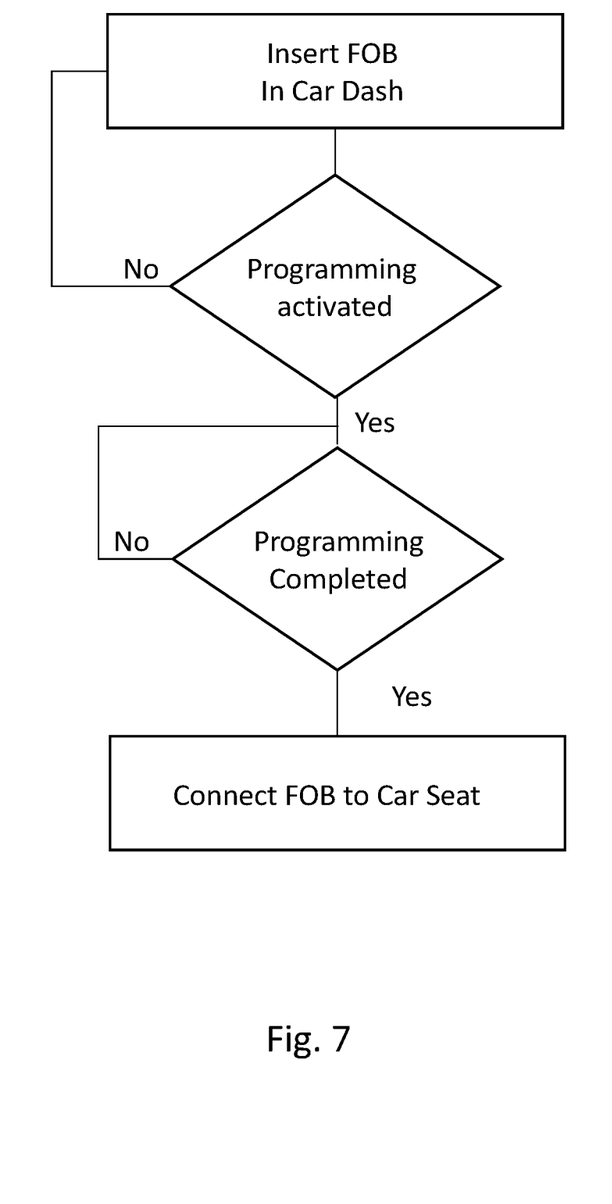
FIG. 7 is a simplified flow diagram of a method of programming a Key Fob according to an embodiment.

Referring to FIG. 7, shown is a simplified flow diagram of a method of using a car seat 20 with a FOB 600. Here, FOB 600 is inserted within the mating insert in the dash of the automobile. The FOB 600 is then programmed by pressing a button on the dashboard. Alternatively, inserting the FOB results in programming thereof automatically. Once programmed, the FOB 600 is inserted in the adapter indent 241 of car seat 20 and operates similarly to the FOB 400 as described in the flow diagram of FIG. 5. Alternatively, the FOB 600 is programmed for all vehicles and selection of the vehicle or automatic detection of the vehicle is performed.

Also, though many functions of the system are performed by the FOB coupled to the child car seat, in alternative embodiments, some or most of those functions are performed by the FOB 600.

It is also supported to use aftermarket FOBs that are programmed based on a make and model of vehicle and programmed to uniquely—or seemingly uniquely—function to control a vehicle in which a car seat is installed.

Figure 8:
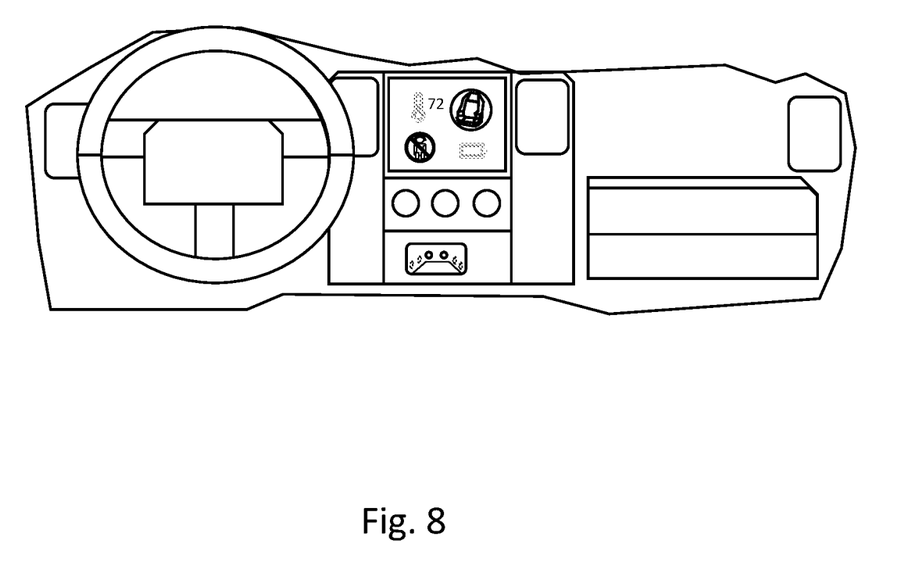
FIG. 8 is a simplified diagram of a car dashboard indicating indicator warning lights for use with an embodiment system.

Referring to FIG. 8, shown is a simplified dashboard with a child car seat indicator. The child car seat indicator shows a child car seat once installed. It is intended to show a red indication—image—when no child is installed in the car seat. When a child is present, the indicator is green, indicating that a child is in the seat. Clearly, if one of the two buckles is not fastened, the current does not flow, then the FOB reports same and the indicator can indicate this in a number of fashions including changing the indicator colour, another indicator, a sound, or impeded vehicular operation. In FIG. 8, a child image with a red line through it is used to indicate that the child is unsafe. That said, the indicator form and behaviour is at the discretion of the automobile manufacturer.

Another indicator shows the child car seat temperature. Thus, a vehicle operator can see the temperature of the child as they operate the vehicle. The temperature is displayed in green when within a predetermined "safe" range and in red when the temperature rises to an unsafe temperature requiring or wherein intervention is recommended. In some embodiments, when the indicator turns red, a sound is also emitted to warn the vehicle operator. Further, after a predetermined time or upon exceeding second more dangerous temperature, a further warning, such as siren or a honking of the car horn, and/or opening the car windows, and/or unlocking the car doors, results.

Yet another indicator shows the battery storage remaining within the FOB to ensure that it is operational either by recommending recharging of the FOB or by recommending changing batteries of the FOB. Of course, when the indicator shows low battery, battery maintenance is another car maintenance issue that is addressable during regular check ups.

In some embodiments, the car communicates with the FOB even when non-operational such that the safety features operate even when the driver has exited the car and locked it.

In some embodiments, the FOB and automobile cooperate to provide passers by—strangers—an opportunity to intervene when first attempts at warning a vehicle operator fail. In other embodiments, vehicles intervene automatically by starting and running air conditioning or heat to adjust cabin temperature or by refusing to engage a transmission until the child is safely fastened into the car seat. These features are at the discretion of car manufacturers or, alternatively, may be regulated.

When a FOB includes a temperature sensor and a warning mechanism, it is, in some embodiments, operational even when the car seat is removed from the vehicle, thereby enhancing the safety of a child by monitoring such things as temperature of a child within the car seat even when removed form the vehicle.

In a simple embodiment working with existing cars, a system might, in response to a hot day outside and a child left in a car seat—or more accurately a condition that might be a child left in a car seat, sound a bell or buzzer to warn of an unsafe situation, then if the situation is unremediated, sound the car horn, lower the car windows and unlock the car, then if still unremediated contact someone, for example OnStar®. Thus, within a matter of minutes the authorities are notified and can have someone nearby check the situation.

Though the term 'alarm' or 'horn' is used with reference to making a sound or alerting bystanders, using present technologies, which are highly digitized, it is a straightforward matter to make an alert sound or a plurality of alert sounds that are unique and indicative. For example, an S.O.S. sound is initiated when the temperature and time exceed a threshold. Thus, three short loud sounds followed by three longer loud sounds followed by three shorter loud sounds would signal an emergency. Other patterns of noise and flashing of car lights are possible to indicate the emergency and to identify a source of the emergency to passers by, emergency workers, and an owner of the vehicle. Rapid on/off switching the FOB's alarm function can synthesize a "rescue me" alarm distinct from the on "panic alarm." Further, changes to the alarming condition or sound are useful to maintain interest in the alarm condition when unaddressed.

Though the above embodiments are shown with reference to physical conductive contacts, magnetic or other non-contact electrical coupling are also supportable. In some embodiments, the FOB 600 communicates with systems of the automobile wirelessly. In other embodiments, the FOB 600 communicates with the automobile only via the OBD port.

Though a weight sensor is shown for detecting a child within a car seat, other sensors are known for detecting a presence of a person within a seat.

Another sensor circuit comprises a sensor for sensing a position of the buckle. Lap buckles for child car seats often include a between the leg strap for retaining a portion of the buckle. Commonly, when buckled, the strap is upright. When unfastened, it is bent or more horizontal. By placing a sensor on the strap or on the buckle, the orientation of the buckle is sensible to determine a state of the buckle—fastened or unfastened. The resulting sensor and communication circuit is useful in retrofitting older model car seats to provide similar functionality. In some embodiments, such a sensor circuit further comprises a weight sensor for being placed under the car seat padding to detect a child within the car seat. Of course, further sensors such as a microphone are also useful, as indicated above.

Numerous other embodiments may be envisaged without departing form the spirit or scope of the invention.

What is claimed is:

1. A child car seat comprising:
a seat form for accommodating a child;
a belt for retaining a child within the child car seat;
a first buckle operable between a first open position and a second other fastened position, for when fastened fastening the belt to retain a child and for when open facilitating installation and removal of a child from the child car seat; and
an interface port for removably retaining a first electronic circuit comprising electrical circuitry comprising communication circuitry for communicating with an automobile, the interface port comprising a plurality of electrical conductors for electrically coupling with the electrical circuitry within the first electronic circuit,
the child car seat comprising circuits for use in detection of operational parameters of the child car seat including at least one of a presence of a child within the child car seat and a position of the first buckle and other than comprising a battery when the first electronic circuit is other than removably retained thereby.

2. A child car seat according to claim 1 comprising:
a first conductor comprising a first contact at the first buckle and extending to the interface port;
a second conductor comprising a second contact at the first buckle and extending to the interface port the second contact for contacting the first contact when and only when the first buckle is secured.

3. A child car seat according to claim 2 comprising:
a second buckle;
a third conductor comprising a third contact at the second buckle and extending to the interface port;
a fourth conductor comprising a fourth contact at the second buckle and extending to the interface port the fourth contact for contacting the third contact when and only when the second buckle is secured.

4. A child car seat according to claim 1 comprising:
a first conductor extending from the first buckle to the interface port;
a second conductor extending from the first buckle to the interface port, the first and second conductors forming a closed loop with two terminals at the interface port when and only when the first buckle is secured.

5. A child car seat according to claim 3 comprising:
a third conductor extending from the second buckle to the interface port;
a fourth conductor extending from the second buckle to the interface port, the third and fourth conductors forming a closed loop with two terminals at the interface port when and only when the second buckle is secured.

6. A child car seat as defined in claim 1 wherein the communication signal is for resulting in temperature control within the vehicle.

7. A child car seat comprising:
an interface for interfacing with a communication circuit for communicating with an automobile, the communication circuit portable relative to the child car seat, the interface for electrically coupling with the communication circuit and for maintaining the communication circuit in a first physical relation to the interface,
wherein the interface frictionally couples to the communication circuit, and
wherein the interface comprises electrical contacts for contacting electrical contacts of the communication circuit, the electrical contacts for conducting electrical signals for sensing in relation to a child in the child car seat and the communication circuit responsive to the sensing.

8. A child car seat as defined in claim 7 wherein the communication signal is for resulting in temperature control within the vehicle.

9. A child car seat system comprising:
an interface for interfacing with a communication circuit for communicating with an automobile, the communication circuit portable relative to the child car seat, the interface for electrically coupling with the communication circuit and for maintaining the communication circuit in a first physical relation to the interface; and
a Key Fob comprising the communication circuit for communicating with an automobile and at least a circuit for electrically coupling with the interface, the Key Fob other than a smart phone wherein in use the Key Fob receives at least a signal from at least a sensor via the interface and relating to operational parameters of the child car seat and communicates a wireless signal in response thereto.

10. A child car seat system according to claim 9 wherein the Key Fob comprises a temperature sensing circuit.

11. A child car seat system according to claim 9 wherein the Key Fob comprises a battery for powering the communication circuit.

12. A child car seat system according to claim 11 wherein the at least a circuit comprises a first circuit portion forming an incomplete circuit for coupling with a second circuit portion forming part of a child car seat and indicative of a status of an occupant of the child car seat, the at least a circuit in an open state for other than switching battery power to conduct absent the second circuit portion being in a closed arrangement and coupled therewith.

13. A child car seat system according to claim 12 for use in an automobile.

14. A child car seat system according to claim 13 wherein the communication circuit comprises circuitry for communicating a signal to unlock doors of an automobile.

15. A child car seat system according to claim 13 wherein the communication circuit comprises circuitry for communicating a signal to open windows of an automobile.

16. A child car seat system according to claim 13 wherein the communication circuit comprises circuitry for communicating a signal to sound a horn of an automobile.

17. A child car seat system according to claim 13 wherein the communication circuit comprises circuitry for communicating a signal to initiate an alarm of an automobile.

18. A child car seat system according to claim 13 wherein the communication circuit comprises circuitry for communicating a signal to sound an alarm of an automobile that is unique to the situation.

19. A child car seat system according to claim 13 wherein the communication circuit comprises circuitry for communicating a signal to call from an automobile for help from a third party unrelated to the car owner.

20. A child car seat as defined in claim 9 wherein the communication signal is for resulting in temperature control within the vehicle.

21. A child car seat comprising:
a seat form for accommodating a child;
a belt for retaining a child within the child car seat, the belt comprising an integrated conductor;
a first buckle operable between a first open position and a second other fastened position, for when fastened fastening the belt to retain a child and for when open facilitating installation and removal of a child from the child car seat; and
an interface port for removably retaining a first electronic component for communicating with an automobile, the interface port comprising a plurality of electrical conductors for electrically coupling with the first electronic component within the first electronic circuit, the integrated conductor for resulting in conduction between at least two of the electrical conductors when the buckle is in the second other fastened position and other than conduction when the buckle is in the first open position.

22. A method of installing a child car seat comprising:
providing a child car seat comprising:
a seat form for accommodating a child;
a belt for retaining a child within the child car seat;
a first buckle operable between a first open position and a second other fastened position, for when fastened fastening the belt to retain a child and for when open facilitating installation and removal of a child from the child car seat; and
an interface port for removably retaining a first electronic circuit comprising electrical circuitry comprising communication circuitry for communicating with an automobile, the interface port comprising a plurality of electrical conductors for electrically coupling with the electrical circuitry within the first electronic circuit and including conductors for sensing at least one of a presence of a child within the child car seat and a position of the first buckle, the interface port for removably retaining the first electronic circuit;

installing the child car seat within an automobile;

installing a first electronic circuit within the interface port; and leaving the first electronic circuit within the interface port for a duration encompassing more than three consecutive days.

* * * * *